United States Patent [19]
McLauchlan

[11] 3,738,696
[45] June 12, 1973

[54] BUCKLING COLUMN BUMPER SYSTEM WITH VERTICAL DISPLACEMENT-PREVENTING MEANS

[75] Inventor: John McLauchlan, Royal Oak, Mich.

[73] Assignee: Houdaille Industries, Inc., Buffalo, N.Y.

[22] Filed: Apr. 30, 1971

[21] Appl. No.: 138,879

[52] U.S. Cl.......................... 293/70, 293/89, 293/99
[51] Int. Cl............................................ B60r 19/06
[58] Field of Search................ 293/60, 69, 70, 80, 293/83, 84, 85, 86, 87, 89, 99

[56] References Cited
UNITED STATES PATENTS

| | | | |
|---|---|---|---|
| 3,172,268 | 3/1965 | Gensheimer | 61/48 |
| 1,531,508 | 3/1925 | Roth | 293/84 |
| 1,825,086 | 9/1931 | Ohlendorf | 293/85 |
| 3,433,520 | 3/1969 | Kearns et al. | 293/85 |

*Primary Examiner*—Gerald M. Forlenza
*Assistant Examiner*—Robert Saifer
*Attorney*—Hill, Sherman, Meroni, Gross & Simpson

[57] ABSTRACT

A horizontal bumper is supported in relation to a support such as a vehicle frame directly by means of resilient buckling column bars for impact energy storing during displacement of the bumper relative to the frame as permitted by the bars, whereafter the bars return the bumper system to normal position. Jacking and anti-roll support for the bars, as well as stress limiting means, and frictional energy absorption are provided.

22 Claims, 13 Drawing Figures

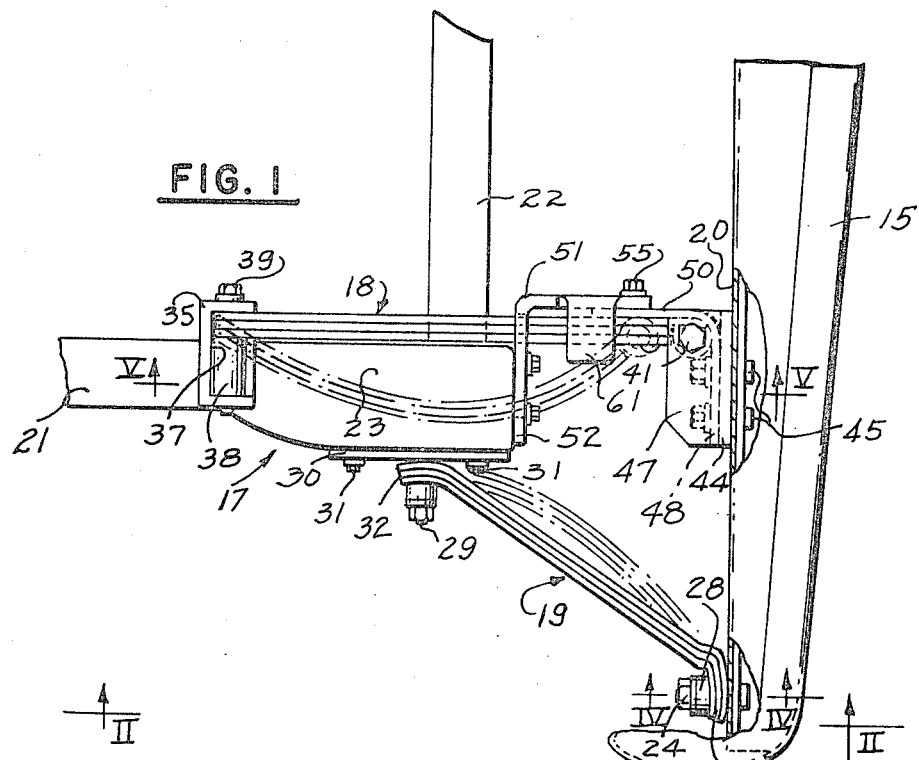
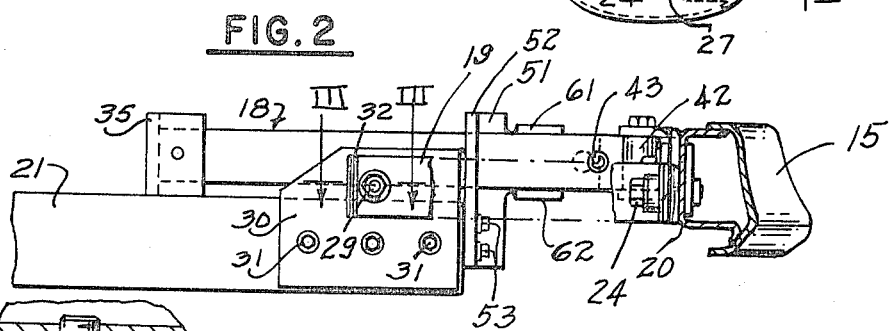
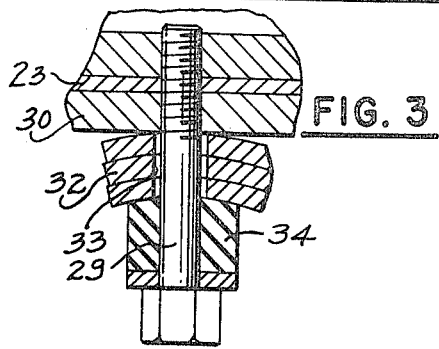
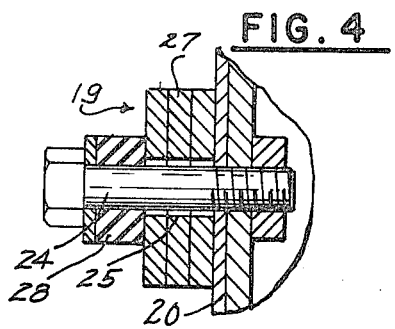

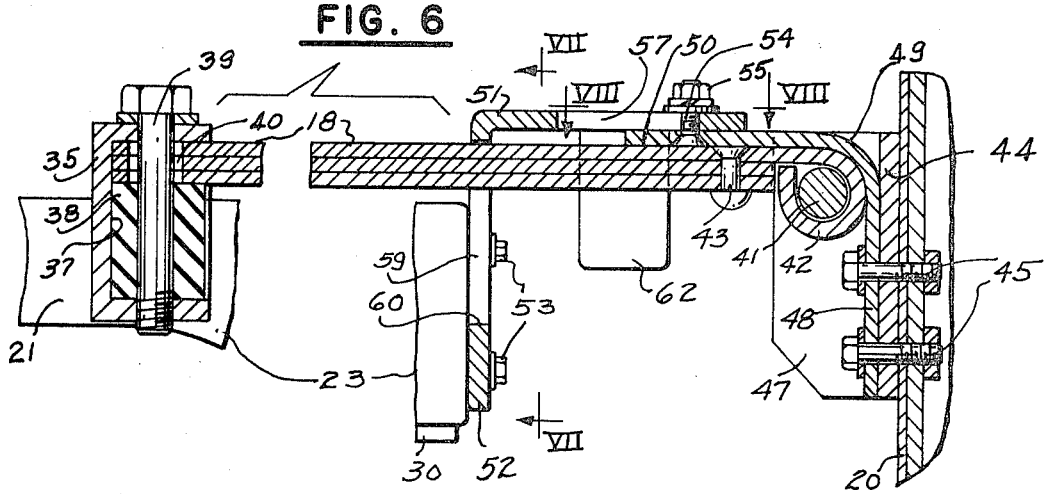
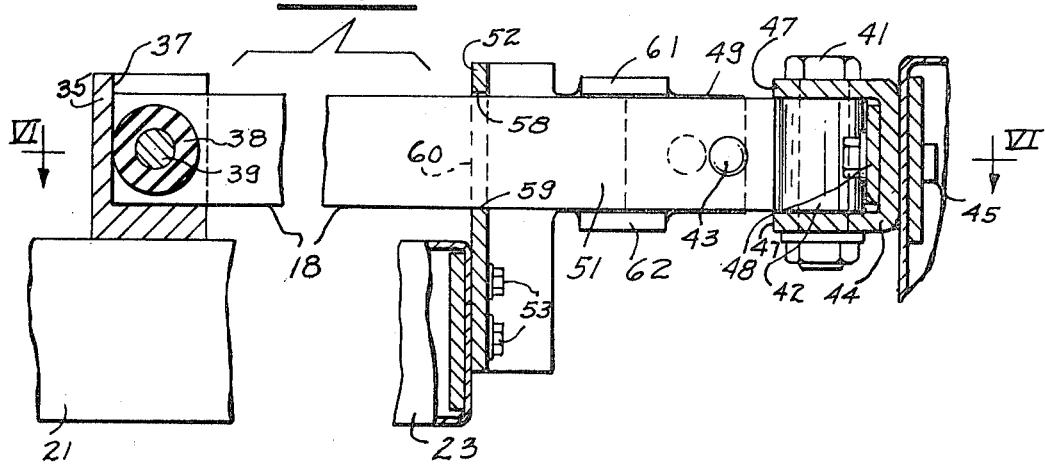
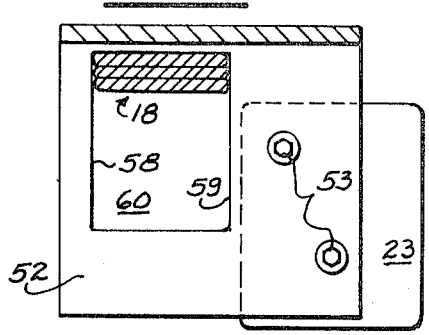
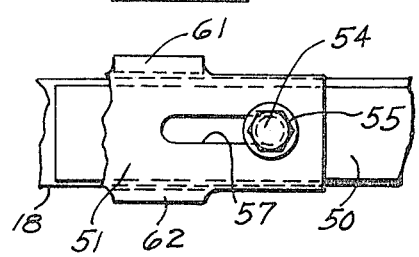

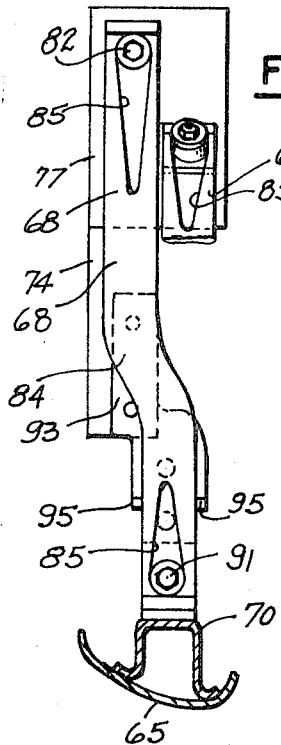
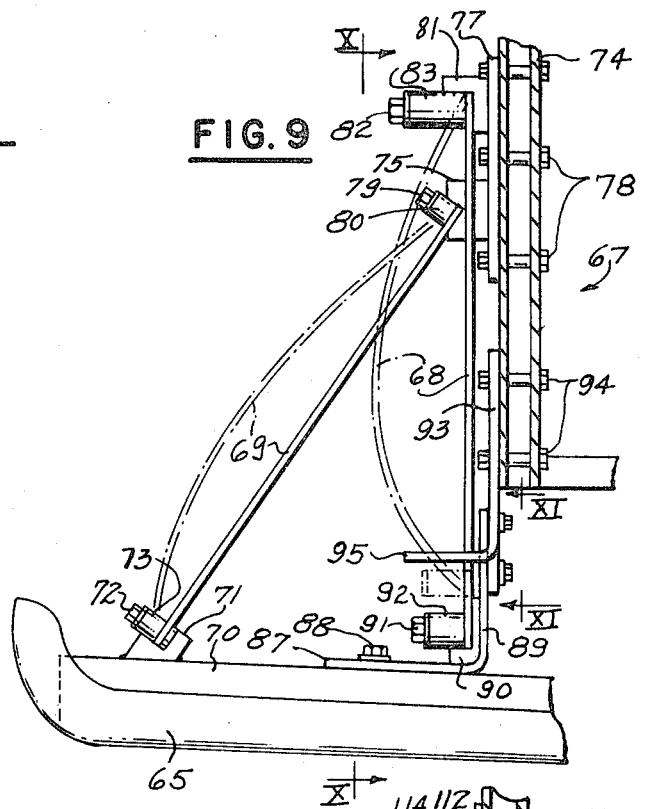
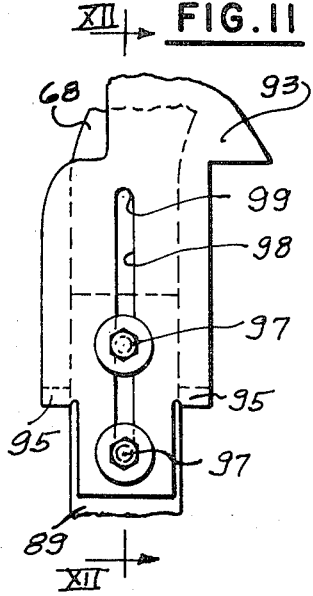
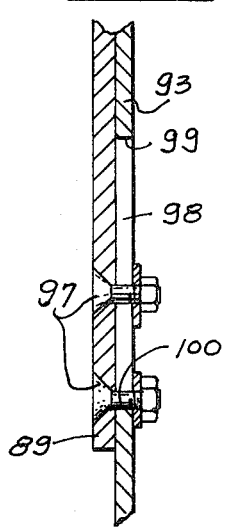
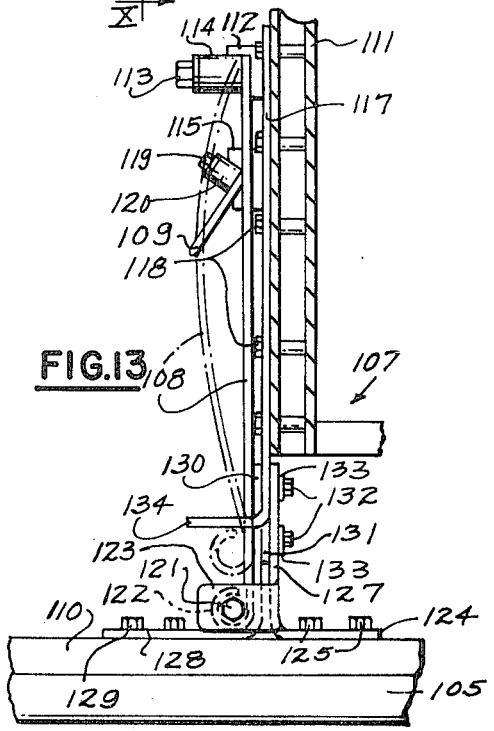
INVENTOR
JOHN McLAUCHLAN

BUCKLING COLUMN BUMPER SYSTEM WITH VERTICAL DISPLACEMENT-PREVENTING MEANS

This invention relates generally to energy storing bumper support systems utilizing resilient buckling column bars, and is more particularly concerned with the mounting of automobile bumpers in a manner to protect the same and the adjacent structure of the vehicle against damage from at least minor collisions to which such bumpers may be subject in the operation of the associated vehicles.

Any moving object developes a certain kinetic energy level proportional to its speed or velocity squared. When the moving object impacts against another moving object or a non-moving object, this kinetic energy must be dissipated and this may occur by deformation of structure or by being stored or absorbed, for example, in a bumper system.

Relating the foregoing specifically to automotive vehicles, and more particularly to automobiles, excessive damage to not only the bumpers but also the adjacent portions of the vehicles has been experienced in respect to present-day bumper designs which have, to a large extent, become mainly decorative trim for the vehicles. Further, it is generally known that in the automobile industry designers are extremely reluctant to sacrifice any styling potentialities, so that there has been a wide draft away from and a virtual impossibility to return to the rugged spring bumpers of an earlier day when the bumpers themselves were generally constructed to absorb rather significant impacts without damage either to the bumpers or to the associated vehicle structure. For reasons of expediency bumpers are generally constructed as shells of relatively soft steel virtually lacking in spring characteristics and unduly liable to be dented and cracked under rather low impact, and more particularly impacts occurring at low as 3 miles per hour up to about 10 miles per hour of one vehicle relative to another, where the bumpers are mounted in an essentially fixed or rigid manner relative to the vehicle frame. To alleviate this serious liability to damage with insurance claims mounting to exorbitant proportions, various expedients have heretofore been proposed, such as constructing the bumpers of fluid-filled resilient tubes, or equipping them with rubber cushions, but such expedients have been largely resisted by the automobile industry and the purchasing public due to detraction from designer latitude, cost, unattractive appearance, and the like. Coiled springs or rubber cushions behind the bumpers have been proposed, but these have been unsatisfactory because they introduce an undesirable spring performance characteristic into the system which is representable by a chart curve showing unduly soft resistance at the beginning of impact, thus requiring excessive travel distance to be effective. A further proposal has been to provide collapsibly yieldable structure in the bumper system, but that requires replacement of the system or parts of the system or a physical resetting after impact. Although hydraulic buffers or dampers are highly efficient and may be used in such system, they are not as versatile as desirable in respect to the direction of impact force, and they add unreasonable cost to original equipment, especially in medium and low priced automobiles, and automobile purchasers resist the expenditure where offered as optional equipment.

Meanwhile, collision insurance rates have necessarily escalated because of the rising volume and size of damage claims, a significant proportion of which result from relatively minor car-to-car collisions where relative vehicle movement is no more than from about three to ten miles per hour, such as in parking lot maneuvering, start-up situations, and congested traffic incidents. This situation has become so serious that not only has there been an indication by the insurance industry of a willingness to reduce collision premium rates by as much as 20 percent on automobiles which can withstand at least a 3 mile per hour rear end bumper impact and 5 miles per hour front end bumper impact without damage, but also Governmental standards have been or are being implemented to this end.

It is to the attainment of the desirable objective of meeting the problems just outlined and to overcoming the deficiencies, defects, inefficiencies, shortcomings and undesirable factors in prior arrangements and proposals that the present invention is directed.

An important object of the present invention is to provide a new and improved energy storing bumper support system which will meet at least the minimum requirements for absorption of impact or collision forces without damage to bumpers or adjacent portions of the vehicle.

Another object of the invention is to provide a new and improved energy storing bumper support system which can be produced and installed at low cost.

A further object of the invention is to provide a new and improved energy storing bumper support system adapted to be installed without extensive modification of bumper or vehicle structure from current designs and permitting wide latitude in designer's options.

Still another object of the invention is to provide a new and improved energy storing bumper support system wherein the entire connection between a bumper and a vehicle frame is provided by resilient buckling column bars, with novel jacking and roll prevention support for the bars.

Yet another object of the invention is to provide a new and improved energy storing bumper support system including resilient buckling column bars and combined frictional energy absorbing means.

A yet further object of the invention is to provide a new and improved resilient buckling column energy storing bumper support system including novel stress limiting means.

Other objects, features and advantages of the invention will be readily apparent from the following description of certain preferred embodiments thereof, taken in conjunction with the accompanying drawings, although variations and modifications may be effected without departing from the spirit and scope of the novel concepts inherent in the disclosure, and in which:

FIG. 1 is a fragmentary plan view of a representative bumper system embodying features of the invention;

FIG. 2 is a sectional elevational view taken substantially in the plane of line II—II of FIG. 1;

FIG. 3 is an enlarged fragmentary sectional detail view taken substantially along the line III—III of FIG. 2;

FIG. 4 is an enlarged fragmentary sectional detail view taken substantially along the line IV—IV of FIG. 1;

FIG. 5 is a fragmental sectional elevational view taken substantially along the line V—V of FIG. 1;

FIG. 6 is a fragmental sectional elevational view taken substantially along the line VI—VI of FIG. 5;

FIG. 7 is a sectional detail view taken substantially along the line VII—VII of FIG. 6;

FIG. 8 is an elevational view taken substantially in the plane of line VIII—VIII of FIG. 6;

FIG. 9 is a fragmentary plan view of a modified arrangement;

FIG. 10 is a sectional elevational view taken substantially along the line X—X of FIG. 9;

FIG. 11 is an enlarged fragmentary elevational view taken substantially in the plane of line XI—XI of FIG. 9;

FIG. 12 is a sectional detail view taken along the line XII—XII of FIG. 11; and, FIG. 13 is a fragmental plan view of a further modification.

A desirable feature of the present invention resides in that a horizontal bumper 15 such as an automobile bumber is connected to and carried on a support such as a vehicle frame 18 by resilient buckling column bars 18 and 19. The bumper 15 may be of any desired configuration and may be made from a desired suitable material, and, as shown, comprises a metal shell with reinforcing bar means 20 secured to its inboard side and to which the buckling column bars are anchored. The vehicle frame 17 desirably comprises a pair of longitudinal laterally spaced frame rail or beam members 21, only one of which is shown together with its associated bumper supporting system structure for conservation of drawing space since the opposite side is identical in reverse relative to the side shown. Transverse tie bar structure 22 is desirable provided between enlarged outboard end portions 23 of the side frame members.

In the arrangement shown, the buckling column bar means 18 extend in the same longitudinal direction as the associated frame member 21 and connect to the bumper 15 in general alignment therewith, while the buckling column bar means 19 extend generally diagonally from the outer side of the frame member portion 23 toward and into connection with the adjacent end portion of the bumper 15 which extends sidewardly substantially beyond the line of longitudinal axis of the frame member 21. Although for relatively smaller compact vehicle installations, the buckling column bar means 18 and 19 may comprise single bars, in the illustrated instance heavier duty requirements are met by having the bar means in the form of a plurality, herein shown as three, like bars assembled in laminar coextensive relation and operatively connected to the bumper and frame in a manner which will attain mutual stable, efficient energy storing buckling as indicated in dash outline in FIG. 1 in response to impact against the bumper forcing it to displace toward the frame. Attachment of the outboard end of the buckling column assembly 19 to the bumper 15 is by means of a bolt 24 secured fixedly to the bumper reinforcement 20 and extending through a free clearance hole 25 in a turned bearing pad terminal portion 27 of the bar assembly to facilitate buckling bending deflections of the bar assembly, with rubber cushioning and take-up, anti-rattle pad means 28 between the head or nut of the bolt and the bar. At their inboard ends, the bars 19 are attached as by means of a bolt 29 rigidly anchored to the side of the frame member portion 23 in this instance through an anchor plate 30 rigidly secured to the frame as by means of bolts 31 and enabling attachment of the bars 19 at a higher elevation than otherwise. To facilitate rocking bearing movement of turned-inboard terminal 32 of the column assembly 19 of the anchor bar 30, the bolt 29 extends through clearance hole 33 in this terminal, and take-up, cushioning, rattle preventing block 34 between the head or nut end of the bolt and the terminal 32 yieldably presses against the terminal.

Mounting of the buckling column bar means 18 is such that resilient buckling deflectional movement of this bar means is adapted to be over the frame member portion 23. To this end, abutment means in the form of a thrust block bracket 35 (FIG. 1, 2, 5 and 6) is rigidly carried on the upper side of the frame member 21, in this instance spaced rearwardly substantially relative to the mounting of the inboard end of the buckling column assembly 19 and against which the inner end of the buckling column 18 is in thrusting bearing relation. In this instance the abutment bracket 35 is provided with a recess 37 opening in the outboard direction and accommodating the inboard end of the bar assembly 18, with a cushioning take-up block 38 compressing the end portion of the bar assembly 18 toward the side of the recess 37 which is nearest the inner side of the frame member 21, and with a retaining bolt 39 extending through a clearance hole 40 in the bar terminal portion.

From the abutment 35, the bar assembly 18 extends in the outboard direction to connection with the bumper 15 and more particularly the reinforcement 20 and to which the outboard end of the assembly is anchored by means of a bolt 41 providing a pivot on a vertical axis extending through a thrust knuckle 42 comprising a turned terminal end portion of one of the laminar bars of the assembly 18, with the remaining bars terminating short of the knuckle curl and with the bars secured together as by means of a rivet 43 in the outboard end portions while the remainder of the length of the bars remain in free laminar abutment facilitating relative sliding during resilient buckling. To facilitate mounting of the anchoring pivot pin 41, a generally clevis-like or U-shaped bracket 44 is provided which is secured as by means of bolts 45 to the reinforcement 20 and provided with upper and lower coextensive horizontal, spaced inwardly direct flanges 47 between which the terminal knuckle curl 42 is received with the bolt 41 therethrough and the bolt secured to the flanges 47.

In addition to its function as a buckling column bar supporting and outboard abutment bearing for the curl terminal 42, the bracket 44 provides means for energy absorption and means for buckling column stress limitation. To this end, bracket 44 carries and has attached, by means of the bolts 45, to the inside of its base web flange, a base flange 48 of a generally L-shape flange bracket extension including a radius portion 49 generally cradling the curl 42, and joining to the flange 48 a limited length longitudinally inwardly extending friction pad flange 50 which freely faces the contiguous one of the buckling column bars 18. Engaged in frictional slidable relation with the outside face of the flange 50 is a complementary combined friction pad and bumper position stabilizing and bottoming out buckling column stress limiting flange 51 mounted in rigidly fixed relation on the outboard end of the frame portion 23 by means of a right angular base flange 52 secured to the frame by means in this instance comprising bolts 53, although riveting or welding may be employed. Means for clamping the friction pad flanges 50 and 51 in face-to-face frictional sliding engagement desirably comprise a bolt 54 having a pressure-applying take-up nut 55 and with the shank of the bolt anchored to the flange 50 and extending through a longitudinal clearance slot 57 in the flange 51. Thereby on impact displacement of the bumper 15 toward the supporting frame, the friction pad flange 50 will move inboard along the friction pad flange 51 with energy absorbing effect, supplementing the energy storing action of the resilient buckling columns 18 and 19. Upon return of the bumper by the outboard thrust imparted by the buckling columns as a result of the reaction from the energy stored therein, the friction pad flanges 50 and 51 act again by energy absorption to damp rebound. It will be appreciated, of course, that the nut 55 of the bolt 54 must not be tightened beyond effecting a clamping pressure at the interface between the flanges and the inner face of the nut or washer companion thereto which will efficiently snub and attain smooth return of the bumper by the buckling columns and which will avoid locking the system against such return.

In addition to the energy absorbing function just described, the flanges 51 and 52 provide means to prevent vertical displacement of the bumper both during jacking, that is lifting the associated vehicle by applying a jack to the bumper, and any tendency toward roll, that is upward displacement of the bumper relative to the vehicle body or the frame, during or incident to an impact. For this purpose, the base flange 52 provides rigid guide and bearing surfaces closely cooperating with the upper and lower edges of the buckling column bar assembly 18. Such bearing surfaces are conveniently provided by an upper edge 58 and a lower edge 59 defining a clearance opening 60 (FIGS. 6 and 7) in the flange 52 and through which the bar assembly 18 extends. In addition, the flange 51 is provided with upper and lower co-extensive flanges 61 and 62 (FIGS. 1, 5 and 6) which are spaced apart the same distance as the space between the bearing edges 58 and 59 and thus provide rigid guiding and bearing surfaces freely closely cooperating with the respective upper and lower edges of the bar assembly 18 supplemental to the surfaces 58 and 59. Through this arrangement excellent support against vertical displacement of the bumper is attained. This function is enhanced by having the edge bearing surfaces for the bar assembly 18 as close as practicable to the outboard end of the bar assembly with a minimum outboard end portion of the buckling column bar assembly in cantilever bumper supporting relation and the major extent of the bar assembly 18 inboard between the flange 52 and the anchoring and abutment bracket 35. Buckling deflections of the bar assembly 18 are readily accommodated by suitable width of the opening 60 in the direction which the bar assembly assumes during maximum bowing deflections.

In addition to their supplemental supporting function, the flanges 61 and 62 function as bump stops having their outboard edges aligned with the inboard edges of the bracket flanges 47 and spaced therefrom a distance predetermined to permit a full range of inboard displacement of the bumper relative to the supporting frame safely within the elastic limits of buckling of the buckling column bars, and from there on transferring inboard impact force to the vehicle frame through the bracket 51, 52.

In the modification of FIGS. 9-12, an arrangement is disclosed which is especially suitable for smaller and lighterweight vehicles and wherein a bumper 65 is supported on a vehicle frame 67 by means of an energy absorbing buckling column bar system including, at each side of the frame a longitudinally extending resilient buckling column bar 68 and a relatively diagonally related buckling column bar 69. Attachment of the outboard end of the bar 69 to the bumper 65 is through an inboard reinforcement 70 for the bumper carrying adjacent to its end an abutment block 71 to which the bar end is connected as by means of a bolt 72, with a rubber cushion 73 providing anti-rattle take-up and permitting pivoting or rocking of the bar end on the block. At its inboard end, the bar 69 is similarly connected to a longitudinally extending frame member 74 which carries an abutment block 75 rigid on a mounting plate 77 which is fixedly rigidly secured to the frame member 74 as by means of bolts 78, means such as a bolt 79 and a rubber block 80 connecting the bar to the block 75 for rocking pivotal movement of its bearing end in a rattle-preventing manner.

In this instance, operative connection of the bar 68 to and between the bumper 65 and the supporting frame 67 is in a manner to permit energy storing buckling of the column 68 and the column 69 and to enable supporting of the bumper by the buckling column bars 68 of the system, as well as to provide a feature of frictional energy absorption supplemental to the buckling columns on impact displacement of the bumper 65 toward the frame 67 and also energy absorption buffing on rebound return of the bumper by the buckling columns on release of the stored energy following impact. To this end, the inboard end of the bar 68 is fixedly attached to the frame member 74 in similar fashion as the bar 69 and on the same side but below and inboard from the abutment 75 to accommodate a desirable length for the bar 68. Accordingly, there is rigidly carried by the inboard end portion of the mounting plate 77 abutment means in the form of a block 81 against which the inboard end of the bar 68 thrusts in bearing relation and against which such end portion may be rigidly attached, but, as shown, is attached by means of a bolt 82, with a rubber cushioning and rattle-preventing take-up cushion 83 interposed between the head of the bolt and the end portion of the bar.

In order to support the bumper 65 at a suitable elevation higher than the frame member 74, and to clear the abutment block 75, the inboard portion of the bar 68 is located at a suitably lower elevation than the outboard portion of the bar, and with an offsetting uniform width ogee connection therebetween which will enable cooperative energy storing buckling of all portions of the bar. Efficiency in the energy storing buckling action of the bar 68, as well as the bar 69 is enhanced by suitable configuration thereof, including generally lanceolate cut-outs 85 in the opposite end portions of the bars extending longitudinally from maximum outer end width toward narrowest dimension at their inner ends, and also serving at their widest ends to accommodate buckling deflections of the associated end portions of the bars relative to their anchoring bolts.

Fixed anchorage of the bar 68 at its outboard end to the bumper 65 may be either rigidly or pivotally on the reinforcement 70. In this instance, mounting means in the form of a generally L-shaped flange bracket are provided including a base flange 87 attached by means of a rivet or bolt 88 to the reinforcement 70 and having an inwardly longitudinally projecting flange 89 alongside the laterally inner face of the bar 68, with a reinforcing rigid abutment member 90 providing an abutment thrust bearing seat for the outboard end of the bar. Attachment of the bar 68 to the abutment 90 is by means comprising a bolt 91 and a take-up, anti-rattle resiliently yieldable rubber cushion 92 permitting pivotal or rocking movement of the attached end portion of the bar during energy storing buckling resulting from inboard displacement of the bumper 65 relative to the frame 67.

Means for holding the bumper 65 against vertical displacement relative to the frame 67 and enabling utilizing the bumper for jacking lifting of the associated vehicle, comprise a rigid bracket 93 in the form of a plate rigidly secured as by means of bolts 94 to the frame member 74 and projecting outboard therefrom parallel to the normal position of the bar 68 and into lapping relation to the flange 89. For cooperation with the bar 68, the bracket 93 has means comprising rigid laterally outwardly projecting, preferably co-extensive upper and lower guide arms 95 which have opposed edges spaced apart to receive the respective upper and lower edges of the bar 68 in free slidable bearing relation permitting unobstructed buckling deflections of the bar but holding the bar against vertical displacement. In addition, a cooperative relation between the bracket 93 and the bracket flange 89 is provided comprising means enabling relative longitudinal movement but retaining these members against vertical displacement. Conveniently such means comprise a pair of longitudinally spaced co-extensive pins 97 (FIGS. 11 and 12) in the form of bolts carried by the flange 89 and extending through a longitudinal slot 98 in the lapping portion of the plate member 93, the slot 98 being longitudinally elongated in the inboard direction to provide ample clearance for full range of inboard displacement of the bumper 65 as enabled by the buckling column system. This arrangement is also adapted for frictional energy absorption and buffing in cooperation with the buckling column bars. For this purpose, the bolts 97 maintain friction pad contact at the interface between the members 89 and 93 sufficient to provide effective energy absorption and supplementary force damping during inboard stroke movement of the bumper, and return stroke rebound buffing. In addition, by suitable length of the slot 98, its inboard end provides a bumper displacement limit stop 99 adapted to be engaged by the inboardmost of the bolts 97. Thereby, energy storing buckling of the bars 68 and 69 is controlled within safe elastic limits and overstressing of the bars is avoided, and at the inboard limit of bumper displacement, further impact force is transferred by the bracket plate 93 to the vehicle frame 67. If desired, a slightly prestressed condition of the buckling column bar system may be attained by proper location of the outboard end of the slot 98 providing a stop 100 engageable by the outboardmost bolt 97 in the maximum outboard thrust normal condition of the bumper support system, and wherein the buckling column bars 68 and 69 remain slightly biased under tension in the starting direction toward which they are intended to buckle on impact against the bumper.

In FIG. 13 is shown an arrangement which is adapted for use in an energy storing bumper support system especially adapted for the heavier types of so-called compact automobiles but not requiring the relatively greater energy storing capacity of a system such as that disclosed in relation to the form of FIG. 1. Accordingly, a bumper 105 is supported impact displaceably relative to a vehicle frame 107, with energy storing buckling columns 108 and 109 connecting the bumper through inboard reinforcement 110 thereon with the frame. At its inboard end, the bar 108 is fixedly connected to the laterally outer side of a longitudinal frame member 111 by means of an abutment block 112 rigidly secured to the frame member and providing a thrust seat for the inboard end of the bar relative to which such inboard end is maintained as by means of a bolt 113 and a rattle-preventing take-up resilient rubber cushion 114. Inboard end mounting of the buckling column bar 109 is effected by means of an abutment block 115 rigidly supported by a bracket plate 117 attached as by means of bolts 118 to the frame member 111, a bolt 119 attaching the bar to the block 115 with a rubber cushioning and take-up resilient block 120. At its outboard end the bar 109 may be secured to the bumper in similar fashion as the outboard end of the bar 69 in FIG. 9.

Outboard end attachment of the bar 108 to the bumper 105 may be rigidly effected, but is shown as pivotally fixed by means of a pin or bolt 121 extending through a terminal thrust curl 122 provided on the end of the bar and received between a pair of co-extensive horizontal pin supporting ear flanges 123 integral with a flange bracket having a base flange 124 secured as by means of rivets or bolts 125 to the reinforcement 110 and provided with a longitudinally inboard extending flange 127 from which the flange ears 123 extend. Reinforced support for the ears 123 is provided by means comprising a flange member having a base flange 128 secured as by means of a rivet or bolt 129 to the reinforcement 110 and having longitudinally inboard extending flange 130 edgewise between the ear flanges 123 and projecting co-extensive with the flange 127. In this arrangement the flange 128 provides a bearing abutment for the outboard thrust terminal of the bar 108.

In addition to their buckling column bar supporting and anchoring function, the flanges 127 and 130 provide, together with an outboard extension 131 of the bracket plate 117 vertical displacement preventing means for the bumper 105 and energy absorbing friction pad and buffer means. To this end, the bracket plate portion 131 is engaged in frictional face-to-face relation by and between the flanges 127 and 130, and connecting and clamping means comprising a pair of longitudinally spaced bolts 132 are carried by flanges 127 and 130 and extend through a slot in the plate portion 131 on the order of the slot 98 in FIG. 12. Desirably spring washers 133 are provided in association with the bolts in order to assist in providing the desired frictional pressure against the plate portion 131 for effective inboard energy absorption supplemental to the energy storing function of the buckling column bars 108 and 109 and outboard friction buffing during rebound. While the bolts 132 may provide substantial vertical displacement preventing support, a pair of co-extensive laterally outwardly extending bearing arms 134 are desirably provided, on the order of the similar arms 95 in FIGS. 9 and 10, freely engageable in bearing relation with the respective upper and lower edges of the bar 108.

In any form of the invention, construction of the buckling column bars in such that in operation they will attain a high resistance level to endwise impact forces thereagainst initially and maintain that resistance relatively constant throughout the available bumper support system travel stroke. Namely, the bars will buckle resiliently within their elastic limits calculated to resist the full range of permissible displacement between the bumper and the frame and then, when the impact or other pressure is relieved, will return resiliently to normal position, thereby returning the bumper to its normal position. Desirably, the buckling column bars are made from suitable spring material, such as SAE 1060 to 1080 steel heat-treated after formation of the bars to attain substantially bainite characteristics with a high degree of toughness, strength and resilience. Typically, the buckling column bars may be of about ⅛ to 0.2 inch by 2 to 6 inches cross-section and with the effective lengths of the bars up to 36 inches, depending upon the specific requirements of the particular bumper support system.

Because the respective opposite ends of the buckling column bars are anchored and all force transmission to the bars is through their ends and not crosswise to the bars, so that their length must shorten by resilient buckling upon impact of the bumper, they do not act the same as springs to which the force is applied in the manner of a lever such that the action is relatively soft initially and then gradually builds up to maximum resistance. Contrary to the action of a spring, the buckling column bars resist deflection relatively constantly throughout their range of buckling resilience. Not only do the buckling column bars afford stable, substantially uniform resistance to impact force but they also return the bumper in the same uniform, stable manner after the impact force or pressure terminates and the energy stored in the buckling columns effects return thereof and thereby the bumper to the original position.

It will be understood that variations and modifications may be effected without departing from the spirit and scope of the novel concepts of this invention.

I claim as my invention:

1. An energy storing system supporting a bumper inboard-displaceably relative to a supporting structure, comprising:

resilient buckling column bar means constructed of a non-elastomeric material having a relatively high modulus of elasticity, and a relatively high yield point, both in the order of heat-treated steel, and having a high force to short travel distance in the buckling mode fixedly anchored inboard to the supporting structure and outboard to the bumper and operative in response to forced displacement of the bumper inboard relative to the supporting structure to buckle within a buckling plane and store energy of the applied force; and means carried rigidly by the supporting structure and including a part opposing said bar means in a plane generally parallel to said buckling plane and permitting free buckling movements of the bar means in said buckling plane but holding the bar means against displacement from said plane.

2. A system according to claim 1, including rigid abutment means carried by the supporting structure, the bar means having inboard end bearing structure thrusting against said abutment means and means connecting the bar means to said abutment means enabling pivoting of said end structure during column buckling without interference with said thrusting of the bearing structure.

3. A system according to claim 1, including abutment means carried by the bumper, said bar means having outboard end bearing structure thrusting against said abutment means, and means connecting the bar means to said abutment means enabling pivotal movement of the bearing structure during buckling of the bar means without interference with said thrusting of the bearing structure.

4. A system according to claim 3, said abutment means comprising a bracket attached rigidly to the bumper, said bearing structure comprising a curled bar terminal, and a pivot pin supported by said bracket and engaged through said terminal curl.

5. A system according to claim 1, said means carried by the supporting structure comprising a bracket having bearing means providing said part engageable with said bar means.

6. A system according to claim 5, said bearing means part comprising opposed bearing flanges between which said bar means extend.

7. A system according to claim 5, said bearing means part comprising a flange having edges defining a clearance opening through said flange.

8. A system according to claim 1, said bumper comprising a vehicle bumper and said supporting structure comprising a vehicle frame including a longitudinal frame member having an outboard end relative to which the bumper is supported in outboard spaced relation by said bar means, said bar means comprising a resilient metal bar having a length extending from an outboard end anchored to the bumper to an inboard end anchored to said frame member a substantial distance inboard from said outboard end of the frame member and with the major extent of the bar extending along said frame member, said bar having a width strongly resisting load deflections and oriented vertically and a thickness facilitating resilient buckling in horizontal direction responsive to endwise force applied longitudinally to the bar, said means carried by the supporting structure being mounted adjacent to said outboard end of the frame member providing rigid restraint against vertical displacements of the bar from dead load of bumper and bar and jacking loads when the vehicle is raised by a jack applied under the bumper but permitting said free buckling movements in horizontal direction relative to the frame member.

9. A system according to claim 1, including a stop flange carried by the bumper, and a stop flange carried by the supporting structure, said stop flange being normally spaced apart a predetermined bumper displacement stroke distance and being engageable at the stroke limit to transfer force from the bumper to the supporting structure.

10. An energy storing system supporting a bumper inboard displaceably relative to a supporting structure, comprising:

resilient buckling column bar means fixedly anchored inboard to the supporting structure and outboard to the bumper and operative in response to forced displacement of the bumper inboard relative to the supporting structure to buckle within a buckling plane and store energy of the applied force;

means carried by the supporting structure permitting free buckling movements of the bar means in said buckling plane but holding the bar means against displacement from said plane; abutment means carried by the bumper against which outboard end bearing structure of the bar means thrust, and means connecting the bar means to said abutment means enabling pivotal movement of the bearing structure during buckling of the bar means;

said abutment means comprising a bracket attached rigidly to the bumper;

said bearing structure comprising a curled bar terminal; and a pivot pin supported by said bracket and engaged through said terminal curl.

11. A system according to claim 10, said bar means comprising a plurality of bars in laminar relation, and means securing the bars together adjacent to said curl.

12. An energy storing system supporting a bumper inboard-displaceably relative to a supporting structure, comprising:

resilient buckling column bar means fixedly anchored inboard to the supporting structure and outboard to the bumper and operative in response to forced displacement of the bumper inboard relative to the supporting structure to buckle within a buckling plane and store energy of the applied force;

mean carried by the supporting structure permitting free buckling movements of the bar means in said buckling plane but holding the bar means against displacement from said plane;

bracket structure carried by the bumper and providing means for fixedly anchoring the bar means to the bumper;

means carried by said bracket structure and by said means carried by the supporting structure cooperatively providing energy absorbing friction pad means operative supplemental to the energy storing operation of the bar means during inboard forced displacement of the bumper relative to the supporting structure;

said friction pad means comprising respective flanges in face-to-face frictional engagement; and means pressing the flanges together in relatively frictionally slidable relation.

13. A system according to claim 12, one of said flanges having a longitudinal slot, said means pressing the flanges together comprising a pair of longitudinally spaced bolts carried by the other of said flanges and assisting said means carried by the supporting structure in holding the bar means in said buckling plane.

14. An energy storing system supporting a bumper inboard-displaceably relative to a supporting structure, comprising:

resilient buckling column bar means fixedly anchored inboard to the supporting structure and outboard to the bumper and operative in response to forced displacement of the bumper inboard relative to the supporting structure to buckle within a buckling plane and store energy of the applied force; and means carried by the supporting structure permitting free buckling movements of the bar means in said buckling plane but holding the bar means against displacement from said plane;

said bumper comprising a vehicle bumper and said supporting structure comprising a vehicle frame including a longitudinal frame member having an outboard end relative to which the bumper is supported in outboard spaced relation by said bar means;

said bar means comprising a resilient metal bar having a length extending from an outboard end anchored to the bumper to an inboard end anchored to said frame member a substantial distance inboard from said outboard end of the frame member and with the major extent of the bar extending along said frame member;

said bar having a width strongly resisting load deflections and oriented vertically and a thickness facilitating resilient buckling in horizontal direction responsive to endwise force applied longitudinally to the bar;

said means carried by the supporting structure being mounted adjacent to said outboard end of the frame member providing rigid restraint against vertical displacements of the bar from dead load of bumper and bar and jacking loads when the vehicle is raised by a jack applied under the bumper but permitting said free buckling movements in horizontal direction relative to the frame member.

15. A system according to claim 14, said bar being mounted above said frame member and said buckling movements being over the top of said frame member.

16. A system according to claim 14, said bar being mounted along a side of said frame member and said buckling movements being in a direction away from said side of the frame member.

17. A system according to claim 14, said bar being mounted operatively above said frame member, and a second resilient buckling column bar extending diagonally to and between and having its respective opposite ends anchored to a side of said frame member and to said bumper.

18. A system according to claim 14, including a second resilient buckling column bar extending diagonally between and having its opposite ends respectively anchored to said bumper and extending therefrom toward one side of the frame member and anchored to the frame member at an elevation adjacent to the top of the frame member, and said first-mentioned resilient buckling column bar extending along the same side of the frame member below said diagonal bar and having an offsetting intermediate portion placing the outboard end portion of said first-mentioned bar at substantially the same elevation as the outboard end of the diagonal bar.

19. A system according to claim 18, comprising a mounting plate secured to said one side of the frame member, and the inboard ends of said bars being anchored to the plate and thereby to said frame member.

20. A system according to claim 19, including a second plate member secured to the same side of said frame member and providing said means carried by the supporting structure.

21. A system according to claim 18, including a mounting plate secured to said frame member and providing the anchorage for said diagonal bar, said mounting plate also providing said means carried by the supporting structure.

22. A system according to claim 21, said plate having a flange portion projecting outboard, a friction pad flange extending inboard from said bumper in lapping relation to said flange extension, and means pressing said flange and flange extension together in frictional sliding energy absorbing relation.

* * * * *